United States Patent [19]

Yamada

[11] Patent Number: 5,322,089
[45] Date of Patent: Jun. 21, 1994

[54] FUZZY INFERENCE CIRCUIT APPARATUS FOR CONTROLLING WEAVING NOZZLE FLUID PRESSURE

[75] Inventor: Shigeo Yamada, Ishikawa, Japan

[73] Assignee: Tsudakoma Kogy Kabushiki Kaisha, Ishikawa, Japan

[21] Appl. No.: 938,850

[22] Filed: Sep. 1, 1992

[30] Foreign Application Priority Data

Nov. 12, 1991 [JP] Japan .................. 3-322449

[51] Int. Cl.⁵ .......................... D03D 47/30
[52] U.S. Cl. ..................... 139/435.2; 139/1 R; 364/470; 364/921; 395/900
[58] Field of Search ............ 395/900; 364/470, 921.1; 139/1 R, 435.2

[56] References Cited

U.S. PATENT DOCUMENTS

| | | | |
|---|---|---|---|
| 4,827,990 | 5/1989 | Takegawa | 139/435.2 |
| 5,101,867 | 4/1992 | Tsutomo et al. | 139/435.2 |
| 5,134,568 | 7/1992 | Sainen . | |
| 5,155,691 | 10/1992 | Sainen . | |

FOREIGN PATENT DOCUMENTS

| | | |
|---|---|---|
| 0403175 | 8/1990 | European Pat. Off. . |
| 0382490 | 7/1992 | European Pat. Off. . |
| 2-210044 | 11/1990 | Japan . |
| 3-104961 | 5/1991 | Japan .................. 139/435.2 |

Primary Examiner—Andrew M. Falik
Attorney, Agent, or Firm—Graybeal Jackson Haley & Johnson

[57] ABSTRACT

An apparatus for controlling weft inserting enables the calculation of accurate pressures suitable to an actual weft and weft inserting device. One or more definite weaving conditions determined by one or more manufacturer's textile and weaving machine specifications and one or more indefinite weaving conditions determined by human senses are inputted to a fuzzy inference circuit in which the pressure value of fluid supplied to a weft inserting nozzle is calculated by fuzzy inference on the basis of the definite and indefinite weaving conditions thus inputted. The weft inserting pressure of the fluid delivered to the weft inserting device is adjusted on the basis of the inferred value.

4 Claims, 11 Drawing Sheets

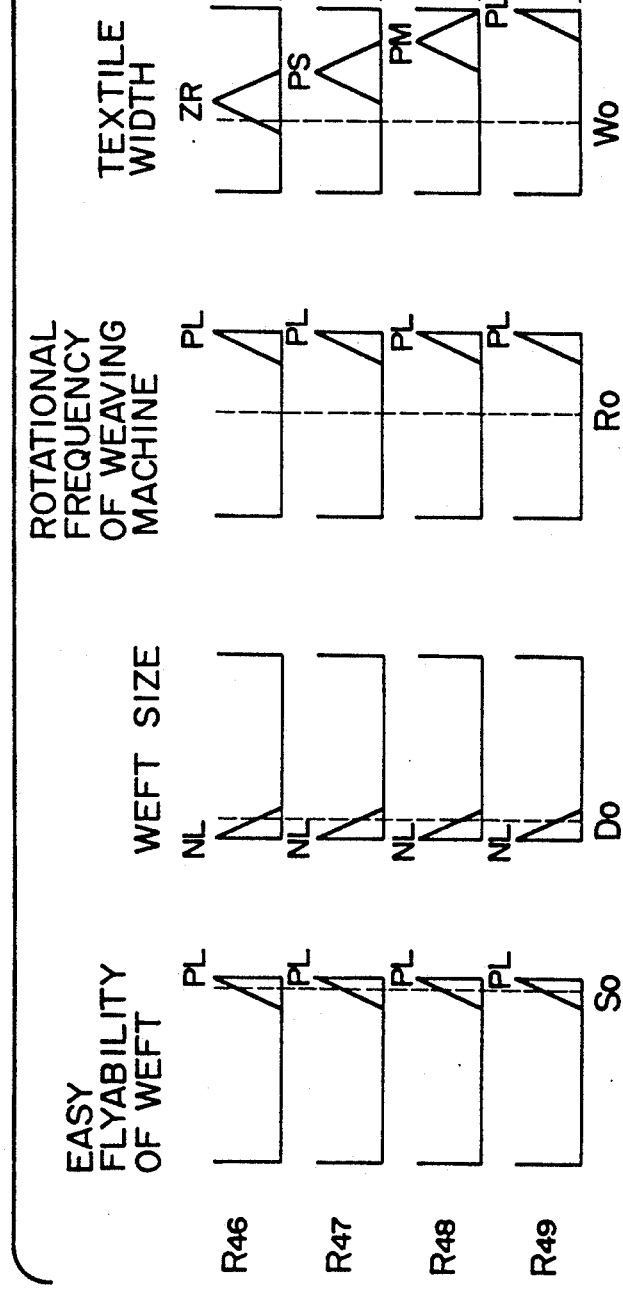
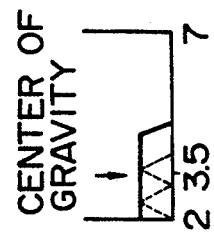
FIG. 9

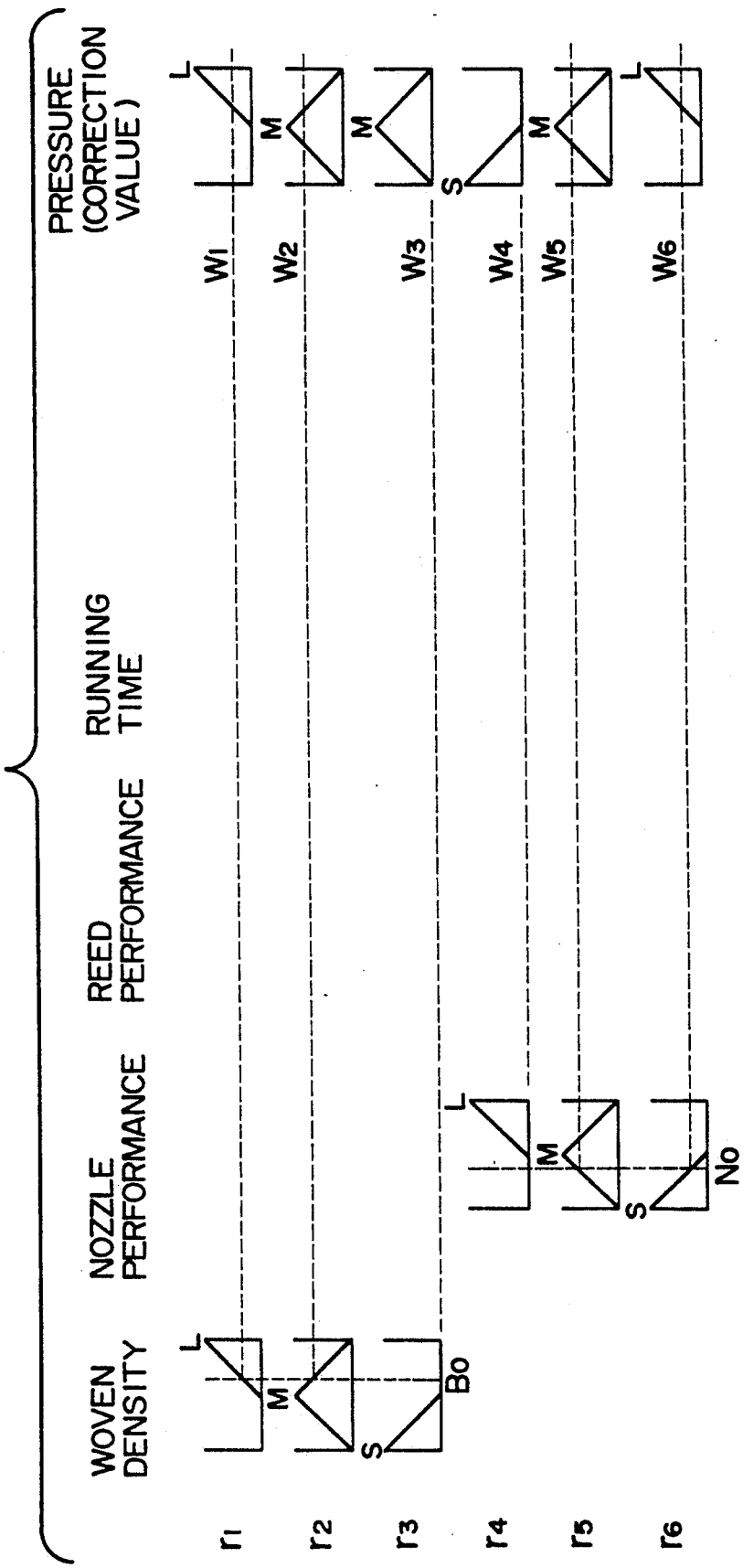

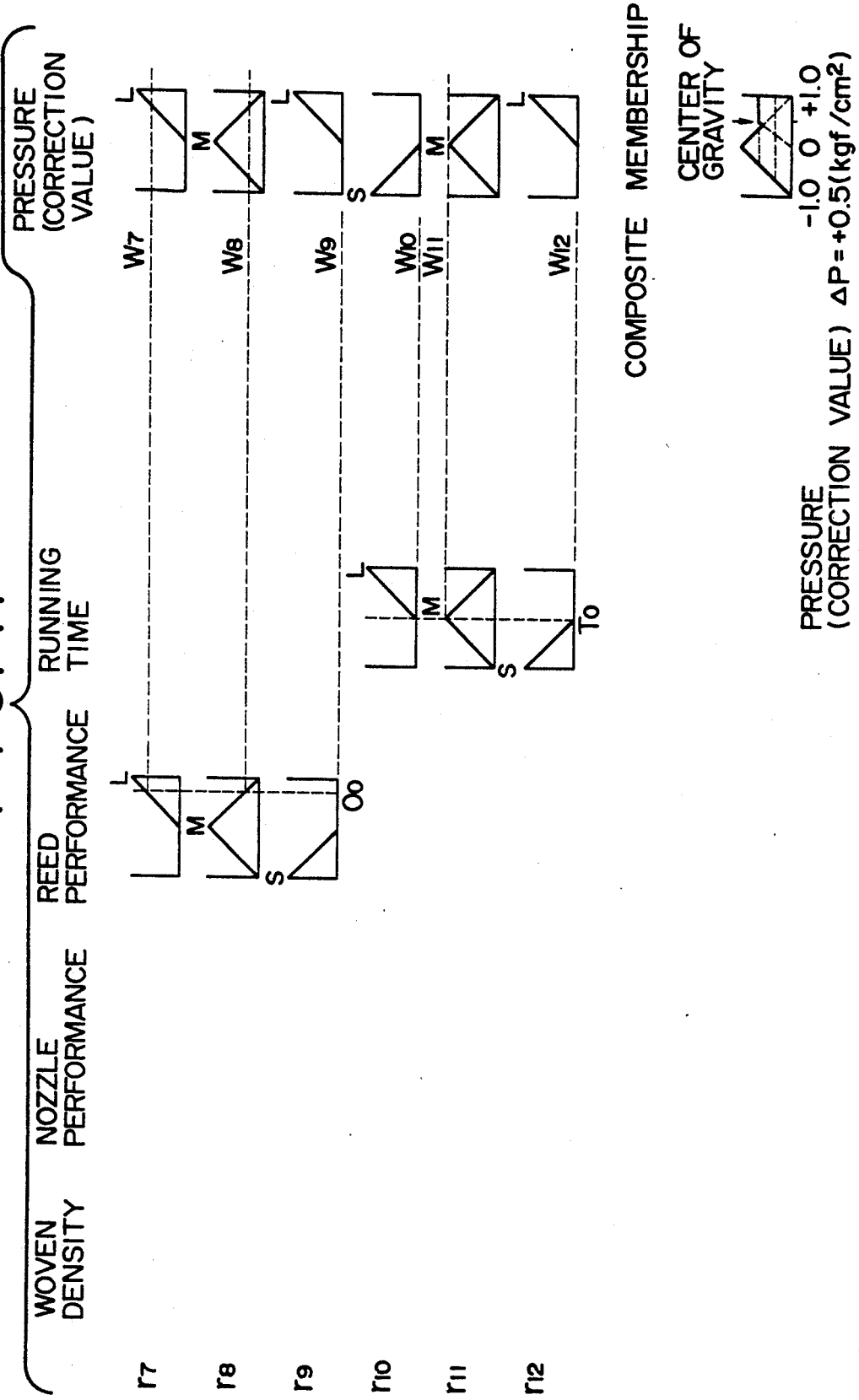

FUZZY INFERENCE CIRCUIT APPARATUS FOR CONTROLLING WEAVING NOZZLE FLUID PRESSURE

BACKGROUND OF THE INVENTION

1. Field of the Invention

This invention relates to an apparatus for controlling weft inserting in an air jet loom, a water jet loom or the like, and more particularly, to an apparatus for controlling the pressure of fluid for weft inserting.

2. Description of the Prior Art

In a jet loom, there is a known disclosure relating to an apparatus for controlling weft inserting which calculates, in particular, a pressure value of fluid provided in a nozzle for weft inserting as well as a weft inserting condition on the basis of textile conditions such as weft types, weft size, woven density, textile width and woven texture, and adjusts the pressure of the fluid on the basis of the calculated pressure value. (Japanese Patent Public Disclosure (KOKAI) Nos. 63-21951 and 63-21953)

In this conventional apparatus for controlling weft inserting, the textile conditions to be used for calculation are the values determined according to the set-up textile conditions such as a weft type: spun yarn-count #50, a fabric width: 150 cm, and a woven density: 50 pcs/in.

In case of the same type of weft, the easy flyability and cuttability thereof would seem to be all the same, but this is not the case. In other words, if the production lots in a weft production process even in the same type of weft are mutually different, the dispersion with respect to the easy flyability and cuttability cannot be avoided since there is some unevenness of the weft in size or some fluff. It cannot be said that the dispersions in easy flyability and cuttability are strictly the same even in the same type of weft.

Such a thing can be said with other things than the dispersion of weft while the weft is manufactured. For example, the same thing can be said with performance of the devices relating to weft inserting such as a weft inserting nozzle, a reed and a length measuring storage device. As described above, the easy flyability and cuttability of weft as well as the performance of a weft insertion device are not such definite values as described above but indefinite values such as "easy to fly", "hard to fly", "easy to be cut" and "hard to be cut".

Since the injection timing of fluid for weft inserting and the operation timing of an engagement pin are not significantly influenced by the preceding indefinite values, there are no problems even in calculating these timing values by using a prior art. In particular, the injection pressure of the weft inserting fluid is, however, largely influenced by the preceding indefinite values.

In the preceding conventional apparatus for controlling weft inserting, however, any preceding indefinite values are not taken into consideration, and therefore, no accurate weft inserting injection pressure suitable to any actual weft and any weft insertion device could be calculated.

SUMMARY OF THE INVENTION

It is an object of the present invention to be able to calculate accurate inserting injection pressure suitable to any actual weft and any weft insertion device.

An apparatus for controlling weft inserting of the present invention comprises means for inputting the definite weaving conditions determined by the specification of textile or that of a weaving machine and the indefinite weaving conditions determined by human senses, means for inferring a pressure value of fluid supplied to a weft inserting nozzle by a fuzzy inference on the basis of both input weaving conditions, and means for adjusting the pressure of the preceding fluid on the basis of the inferred value.

The one or more definite weaving conditions determined by the textile specification can be selected from the group consisting of a weft type, a weft size, a woven density, a textile width, a woven texture and a weft twist number or the like.

Also, the one or more definite weaving conditions determined by the weaving machine specifications can be selected from the group consisting of a weft inserting nozzle type, a reed type, the rotational number of a weaving machine and a weft running time or the like.

Additionally, the indefinite weaving conditions determined by human senses can be one or more conditions selected from the group consisting of the indefinite weft characteristics, the nozzle length measuring device or the like.

In the present invention, the pressure of the fluid jetted from the weft inserting nozzle is inferred by a fuzzy inference on the basis of the one or more definite weaving conditions and the one or more indefinite weaving conditions, and adjusted on the basis of the obtained values.

According to the present invention, the pressure of the fluid for weft inserting can be obtained by use of the one or more weaving conditions such as the easy flyability and cuttability in addition to the one or more definite weaving conditions, and consequently, the one or more accurate pressure suitable to any actual weft and any weft insertion device can be calculated. Since a fuzzy inference is adopted for calculating the pressure, any indefinite quantities can be incorporated in the pressure calculation readily and accurately.

BRIEF DESCRIPTION OF THE DRAWINGS

The foregoing and other objects and features of the invention will become apparent from the following description of preferred embodiments of the invention with reference to the accompanying drawings, in which:

FIG. 9 is an explanatory view continuing to FIG. 8 and showing a fuzzy inference;

FIG. 10 is an explanatory view showing another fuzzy inference; and

FIG. 11 is an explanatory view continuing to FIG. 10 and showing another fuzzy inference.

DETAILED DESCRIPTION OF THE PREFERRED EMBODIMENTS

Figure 1:
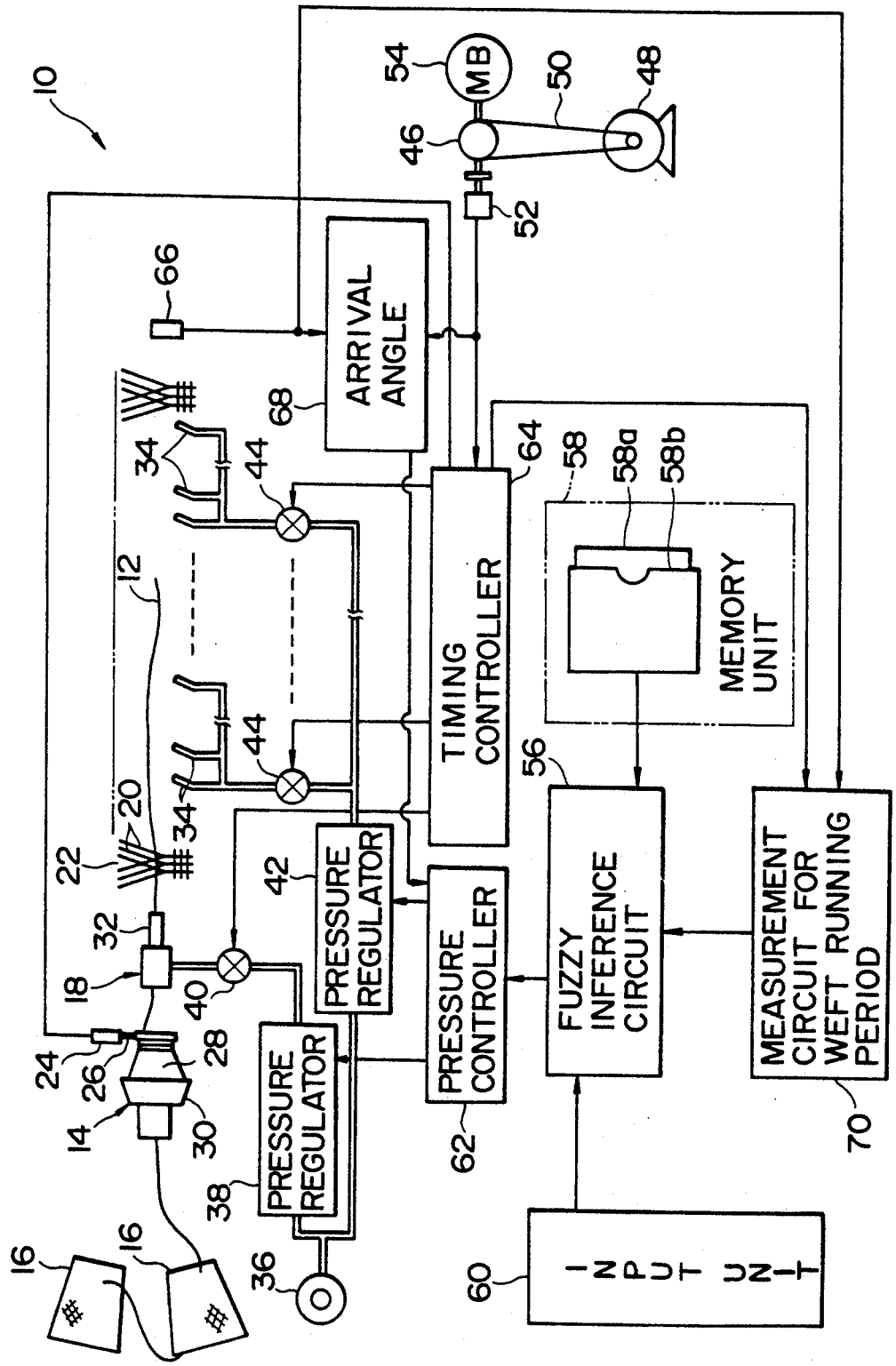
FIG. 1 is a schematic diagram showing a weaving machine provided with an apparatus for controlling weft inserting as a preferred embodiment of the present invention.

Referring now to FIG. 1, a weaving machine 10 is a jet loom of an air or water type and includes a length measuring storage device 14 of a drum type for a weft 12.

The weft 12 is wound up by a plurality of weft packages 16 dividedly. The weft 12 is also supplied from the weft packages 16 to a weft insertion device 18 known per se through the length measuring storage device 14 and is then inserted into a shedding 22 of a warp 20 by the weft insertion device 18. The weft wound around both weft packages 16 is tied with each other so as to act as one piece of weft, in other words, to be continuously drawn out in sequence by the length measuring storage device 14 from the wound weft around one of the weft packages.

The weft 12 is engaged on the external surface of a length measuring and storage drum 28 with a pin 26 having the tip end operated by an electromagnetic solenoid 24, and is wound around the external surface of the length measuring and storage drum 28 by a predetermined length through the rotation of a yarn guide 30.

On the other hand, the weft 12 is released from the pin 26 during weft inserting, and after the weft is jetted from a main nozzle 32 of the weft insertion device 18 together with fluid into the shedding 22 of the warp 20, the weft is cut off. The weft insertion device 18 includes a plurality of subnozzles 34 for jetting the fluid which allows the weft 12 to advance in a predetermined direction during weft inserting.

Operating fluid from a pressure source 36 is supplied into the main nozzle 32 through a pressure regulator 38 and a switching valve 40. On the other hand, the operating fluid from the pressure source 36 is supplied into each of the subnozzles 34 through a pressure regulator 42 and a corresponding switching valve 44.

The weaving machine 10 also includes a motor 48 for a main shaft 46 for driving the reed. The rotation of the motor 48 is transmitted to the main shaft 46 by a connection mechanism 50. An encoder 52 for generating a rotational angle signal corresponding to the rotational angle of the main shaft 46 and an electromagnetic brake 54 for the main shaft 46 are connected with the main shaft 46. The length measuring storage device 14 and the weft insertion device 18 are driven together with a heald and a reed in synchronism with the rotation of the main shaft 46.

An apparatus for controlling weft inserting for the weaving machine 10 includes a fuzzy inference circuit 56 for inferring a pressure value of the fluid supplied into the weft inserting nozzles 32 and 34 on the basis of a fuzzy inference using at least one definite weaving condition determined by textile weaving machine specifications, at least one indefinite weaving condition determined by human senses, a plurality of membership functions and a plurality of fuzzy control rules.

The definite weaving condition determined by a textile specification can be one or more specific values selected from the group of values consisting of a weft type, a weft size, a woven density, a textile width, a woven texture and a weft twist number or the like. In the following explanations, each of the weft size, the textile width, the woven density and the weft twist number will be used as the definite weaving condition determined by the textile specification thereafter.

The definite weaving condition definitely determined by the weaving machine specification can be one or more specific values selected from the group of values consisting of a weft inserting nozzle type, a reed type, the rotational frequency of a weaving machine and the running time of weft or the like. In the following explanations, the rotational frequency of a weaving machine and the running time of weft will be used as the definite weaving condition definitely determined by the specification of the weaving machine thereafter.

The indefinite weaving conditions determined by human senses can be the indefinite conditions such as the easy flyability and cuttability selected from the group consisting of the indefinite weft characteristics, the reed performance, the nozzle performance, the performance of the weft insertion device and the performance of the length measuring device or the like. In the following explanations, the easy flyability of weft, the nozzle performance (the easy flyability of weft), the reed performance (the easy flyability of weft), the easy cuttability of weft and the more or less weft unevenness in size will be used as the indefinite weaving conditions determined by human senses.

The apparatus for controlling weft inserting further includes a memory unit 58 for storing a plurality of membership functions (refer to FIG. 2) to be used for a fuzzy inference in the fuzzy inference circuit 56 and a plurality of fuzzy control rules, an input unit 60 provided with a plurality of setting units for setting the definite and indefinite weaving conditions, a pressure controller 62 for controlling the pressure regulators 38 and 42 on the basis of the signal supplied from the fuzzy inference circuit 56, and a timing controller 64 for operating the switching valves 40 and 44 and the electromagnetic solenoid 24.

Figure 2A:
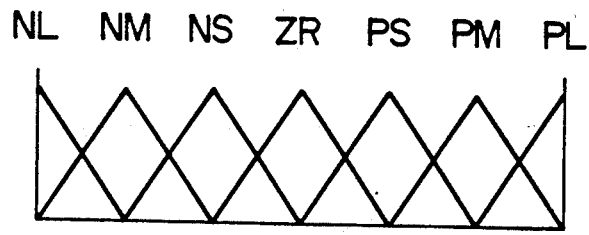
FIGS. 2A and 2B are diagrams showing a fuzzy label as a preferred embodiment of the present invention.

The fuzzy labels NL, NM, NS, ZR, PS, PM and PL shown in FIG. 2(A) are used in common so as to determine each membership function corresponding to the easy flyability of weft, the weft size, the rotational frequency of a weaving machine and the textile width, respectively, among the definite and indefinite weaving conditions as described above.

The fuzzy labels NL, NM, NS, ZR, PS, PM and PL correspond to such terms as "very small", "small" "a little small", "standard", "a little large", "large" and "very large", respectively, and represent the certainty that the corresponding weaving condition belongs to a set of the languages.

In the fuzzy labels NL, NM, NS, ZR, PS, PM and PL, the term "large" means "weft is easy to fly", "a weft is thick", "the rotational speed of a weaving machine is rapid" or "a textile width is wide" depending on the preceding weaving conditions. On the other hand the term "small" means "a weft is hard to fly", "a weft is thin", "the rotational speed of a weaving machine is slow" or "a textile width is narrow" depending on the weaving conditions.

On the basis of these fuzzy labels, each membership function corresponding to the preceding weaving conditions is determined.

When a basic value of a weft inserting fluid pressure (basic pressure) as a control object is calculated, the membership function thus determined is used for how much the set weaving condition conforms to the antecedent part of each of the fuzzy control rules R1 through R49 which will be described later, that is, for the derivation of a degree of adaptation.

The fuzzy labels NL, NM, NS, ZR, PS, PM and PL are also used in order to determine the membership function of a basic pressure, which is a control object and correspond to the terms "increase largely", "increase", "increase a little", "hardly change", "decrease a little", "decrease", and "decrease largely", respectively. These fuzzy labels represent the certainty that a control object (basic pressure) to be increased or decreased belongs to a set of the terms and are used when deriving the consequent part of each of the fuzzy control rules $R_1$ through $R_{49}$ which will be described later on the basis of the degree of adaptation.

Figure 2B:
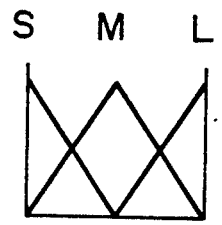

The fuzzy labels S, M and L shown in FIG. 2(B) are used in common for determining each membership function corresponding to the woven density, the nozzle performance, the reed performance, the weft running time, the easy cuttability of weft, the more or less weft unevenness in size and the weft twist number, among the definite and indefinite weaving conditions described above.

The fuzzy labels S, M and L correspond to the terms "small", "standard", and "large", respectively, and represent the certainty that the corresponding weaving conditions belong to a set of the languages.

In the fuzzy labels S, M and L, the term "large" means "a woven density is large", "the nozzle performance is good", "the reed performance is good", and "the running time is long", and the term "small" means "a woven density is small", "the nozzle performance is bad", "the reed performance is bad" and "the running time is short".

Each membership function corresponding to the preceding weaving conditions is determined on the basis of these fuzzy labels.

The membership function thus determined is used for how much the weaving conditions conform to the antecedent part of each of the fuzzy control rules r1 through r12 which will be described later, that is, for the derivation of the degree of adaptation, when a corrected value of the calculated base pressure is calculated.

The fuzzy labels S, M and L and also used for determining the membership functions for correcting the basic pressures, and correspond to the terms "decrease", "hardly change", and "increase", respectively. These fuzzy labels represent the certainty that a control object to be increased or decreased (basic pressure) belongs to a set of the terms and are used when deriving the consequent part of each of the fuzzy control rules r1 through r12 which will be described later on the basis of the preceding degree of adaptation.

Instead of using the fuzzy labels in common, a different fuzzy label may be prepared for each weaving condition. The fuzzy label for a pressure may also be different from that for a weaving condition. Additionally, the membership function for the pressure of the preceding control object is used both for the pressure of main nozzle and the pressure of subnozzle but a different membership function for the pressure of main nozzle and the pressure of subnozzle may also be used.

As the memory unit 58, such a memory circuit as IC memory can be used. It is preferable, however, to use both a writable and readable card type IC memory of information, that is, a memory 58a and a write and read mechanism 58b for writing and reading the information relative to the preceding memory card. By use of such a memory 58a and a write and read mechanism 58b, both of the membership functions to be used for the fuzzy inference and the fuzzy control rules can be easily corrected or altered.

Each definite weaving condition is set by an operator as a specific value in the setter of the input unit 60. However, each definite weaving condition may be inputted from the memory unit 58 to the fuzzy inference circuit 56.

Each indefinite weaving condition is set in the setter of the input unit 60 as an operator's sensitive value. Each indefinite weaving condition can be set as an arbitrary value selected from "0" to "10", depending on the indefinite weaving condition, for example, by defining a case where a weft is very hard to fly as "0", a case where it cannot be said that a weft is easy to fly or a weft is hard to fly as "5" or a case where a weft is easy to fly as "10". As for such a setter, a variable resistance, a digital switch or the like, can be used.

The pressure controller 62 controls the pressure regulators 38 and 42 so that the pressure of the fluid jetted from the main nozzle 32 and the subnozzle 34 may be a value supplied from the fuzzy inference circuit 56. On the other hand, the timing controller 64 operates the switching valves 40 and 44 and the electromagnetic solenoid 24 so that the fluid injection start time, the fluid injection period and the operation start time of the electromagnetic solenoid 24 may be predetermined values thereof, respectively.

The control apparatus for the weaving machine 10 further includes a detector 66 for detecting if the weft 12 is inserted up to a predetermined position. The detector 66 is provided at the opposite side of the main nozzle 32 with respect to the warp 20. As for the detector 66, a photo sensor using a photoelectric transformer can be employed.

The output signals from the detector 66 are supplied to a detection circuit 68 for detecting the weft arrival timing and a measurement circuit 70 for measuring the weft running period.

The detection circuit 68 detects a main shaft angle when the leading end of the weft 12 reaches the position of the detector 66, that is, an arrival angle of the main shaft, as a value representing the arrival timing every each weft inserting on the basis of the rotational angle signal from the encoder 52 and the output signal from the detector 66, and outputs the detected arrival timing to the controller 62. The arrival timing can be, for example, a rotational angle of the main shaft when the output signal of the detector 66 is supplied to the detecting circuit 68.

The measurement circuit 70 measures a time required for one time weft inserting, that is, a weft running period by using the weft inserting start signal supplied from the timing controller 64 and the output signal of the detector 66, and supplies the measured running time to the fuzzy inference circuit 56. Furthermore, the angle required for weft inserting, that is, the running angle may be measured instead of measuring the running time.

Figure 3:
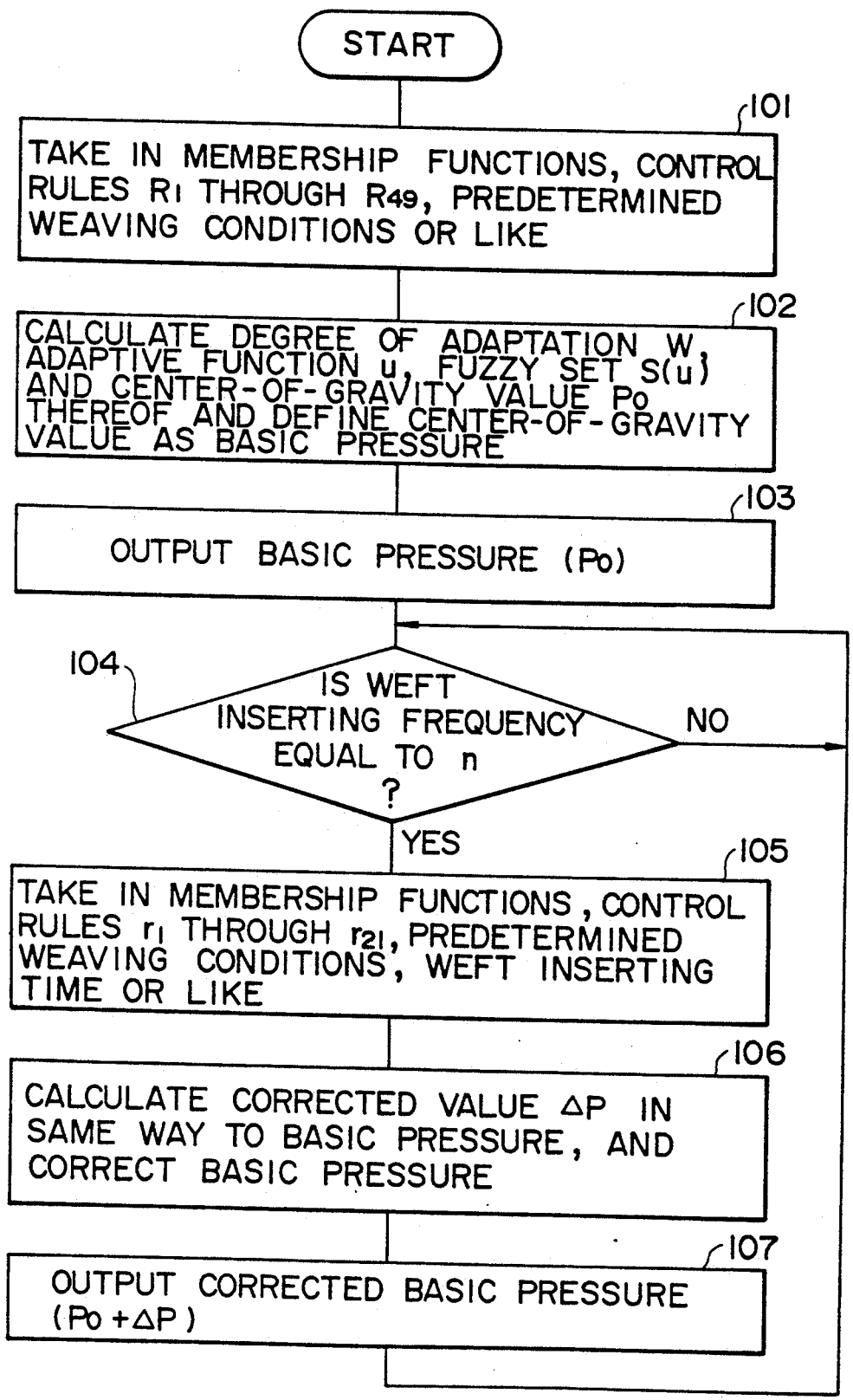
FIG. 3 is a flow chart showing a fuzzy control circuit.
Figure 4:
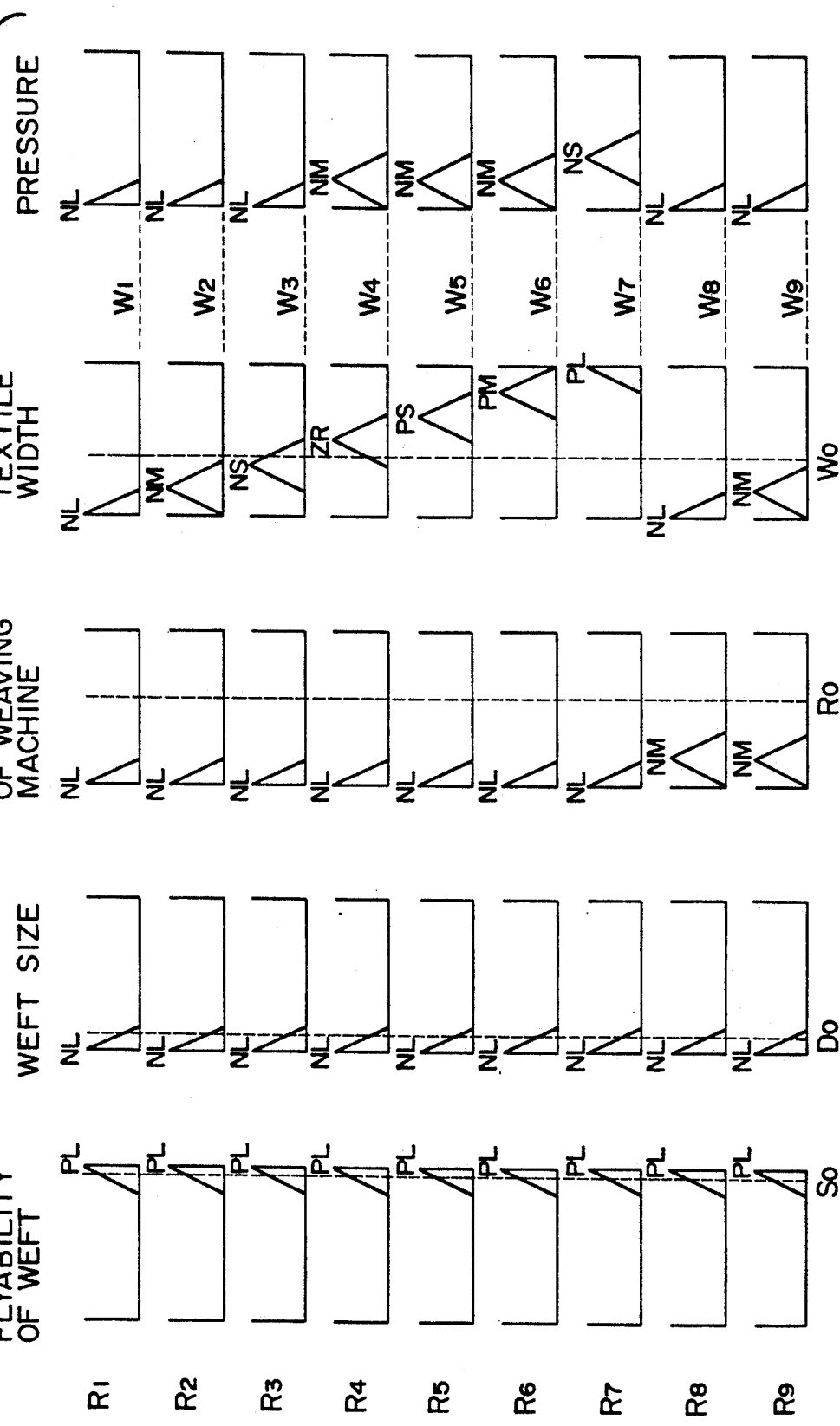
FIG. 4 is an explanatory view showing a fuzzy inference.
Figure 5:
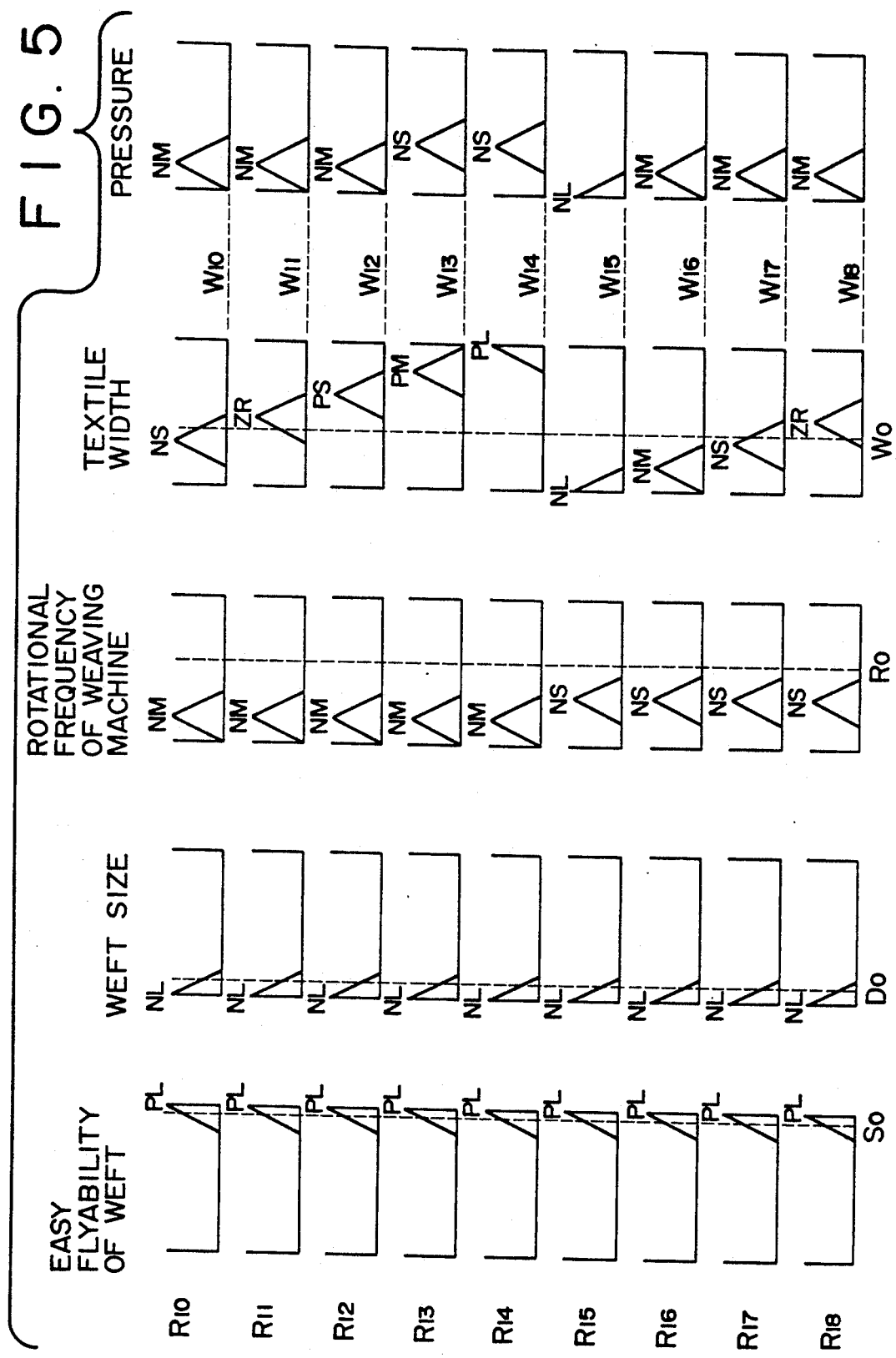
FIG. 5 is an explanatory view continuing to FIG. 4 and showing a fuzzy inference.

Referring now to FIG. 3, the detailed description of an embodiment for calculating the basic pressure of weft inserting fluid will be given in the following. The following fuzzy control rules R1 through R49 and r1 through r21 are stored in the memory unit 58.

R1: Largely decrease the basic pressure (NL), when the weft is very easy to fly (PL), the weft is very thin (NL), the rotational frequency of a weaving machine is very slow (NL) and the textile width is very narrow (NL).

R2: Largely decrease the basic pressure (NL), when the weft is very easy to fly (PL), the weft is very thin (NL), the rotational frequency of a weaving machine is very slow (NL) and the textile width is narrow (NM).

R3: Largely decrease the basic pressure (NL), when the weft is very easy to fly (PL), the weft is very thin (NL), the rotational frequency of a weaving machine is very slow (NL) and the textile width is a little narrow (NS).

R4: Decrease the basic pressure (NM), when the weft is very easy to fly (PL), the weft is very thin (NL), the rotational frequency of a weaving machine is very slow (NL) and the textile width is standard (ZR).

R5: Decrease the basic pressure (NM), when the weft is very easy to fly (PL), the weft is very thin (NL), the rotational frequency of a weaving machine is very slow (NL) and the textile width is a little wide (PS).

R6: Decrease the basic pressure (NM), when the weft is very easy to fly (PL), the weft is very thin (NL), the rotational frequency of a weaving machine is very slow (NL) and the textile width is wide (PM).

R7: Decrease the basic pressure a little (NS), when the weft is very easy to fly (PL), the weft is very thin (NL), the rotational frequency of a weaving machine is very slow (NL) and the textile width is very wide (PL).

R8: Largely decrease the basic pressure (NL), when the weft is very easy to fly (PL), the weft is very thin (NL), the rotational frequency of a weaving machine is slow (NM) and the textile width is very narrow (NL).

R9: Largely decrease the basic pressure (NL), when the weft is very easy to fly (PL), the weft is very thin (NL), the rotational frequency of a weaving machine is slow (NM) and the textile width is narrow (NM).

R10: Decrease the basic pressure (NM), when the weft is very easy to fly (PL), the weft is very thin (NL), the rotational frequency of a weaving machine is slow (NM) and the textile width is a little narrow (NS).

R11: Decrease the basic pressure (NM), when the weft is very easy to fly (PL), the weft is very thin (NL), the rotational frequency of a weaving machine is slow (NM) and the textile width is standard (ZR).

R12: Decrease the basic pressure (NM), when the weft is very easy to fly (PL), the weft is very thin (NL), the rotational frequency of a weaving machine is slow (NM) and the textile width is a little wide (PS).

R13: Decrease the basic pressure a little (NS), when the weft is very easy to fly (PL), the weft is very thin (NL), the rotational frequency of a weaving machine is slow (NM) and the textile width is wide (PM).

R14: Decrease the basic pressure a little (NS), when the weft is very easy to fly (PL), the weft is very thin (NL), the rotational frequency of a weaving machine is slow (NM) and the textile width is very wide (PL).

R15: Largely decrease the basic pressure (NL), when the weft is very easy to fly (PL), the weft is very thin (NL), the rotational frequency of a weaving machine is a little slow (NS) and the textile width is very narrow (NL).

R16: Decrease the basic pressure (NM), when the weft is very easy to fly (PL), the weft is very thin (NL), the rotational frequency of a weaving machine is a little slow (NS) and the textile width is narrow (NM).

R17: Decrease the basic pressure (NM), when the weft is very easy to fly (PL), the weft is very thin (NL), the rotational frequency of a weaving machine is a little slow (NS) and the textile width is a little narrow (NS).

R18: Decrease the basic pressure (NM), when the weft is very easy to fly (PL), the weft is very thin (NL), the rotational frequency of a weaving machine is a little slow (NS) and the textile width is standard (ZR).

R19: Decrease the basic pressure a little (NS), when the weft is very easy to fly (PL), the weft is very thin (NL), the rotational frequency of a weaving machine is a little slow (NS) and the textile width is a little wide (PS).

E20: Decrease the basic pressure a little (NS), when the weft is very easy to fly (PL), the wet is very thin (NL), the rotational frequency of a weaving machine is a little slow (NS) and the textile width is wide (PM).

R21: Decrease the basic pressure a little (NS), when the weft is very easy to fly (PL), the weft is very thin (NL), the rotational frequency of a weaving machine is a little slow (NS) and the textile width is very wide (PL).

R22: Decrease the basic pressure (NM), when the weft is very easy to fly (PL), the weft is very thin (NL), the rotational frequency of a weaving machine is standard (ZR) and the textile width is very narrow (NL).

R23: Decrease the basic pressure (NM), when the weft is very easy to fly (PL), the weft is very thin (NL), the rotational frequency of a weaving machine is standard (ZR) and the textile width is narrow (NM).

R24: Decrease the basic pressure (NM), when the weft is very easy to fly (PL), the weft is very thin (NL), the rotational frequency of a weaving machine is standard (ZR) and the textile width is a little narrow (NS).

R25: Decrease the basic pressure a little (NS), when the weft is very easy to fly (PL), the weft is very thin (NL), the rotational frequency of a weaving machine is standard (ZR) and the textile width is standard (ZR).

R26: Decrease the basic pressure a little (NS), when the weft is very easy to fly (PL), the weft is very thin (NL), the rotational frequency of a weaving machine is standard (ZR) and the textile width is a little wide (PS).

R27: Decrease the basic pressure a little (NS), when the weft is very easy to fly (PL), the weft is very thin (NL), the rotational frequency of a weaving machine is standard (ZR) and the textile width is wide (PM).

R28: Standardize the basic pressure (ZR), when the weft is very easy to fly (PL), the weft is very thin (NL), the rotational frequency of a weaving machine is standard (ZR) and the textile width is very wide (PL).

R29: Decrease the basic pressure (NM), when the weft is very easy to fly (PL), the weft is very thin (NL), the rotational frequency of a weaving machine is a little fast (PS) and the textile width is very narrow (NL).

R30: Decrease the basic pressure (NM), when the weft is very easy to fly (PL), the weft is very thin (NL), the rotational frequency of a weaving machine is a little fast (PS) and the textile width is narrow (NM).

R31: Decrease the basic pressure a little (NS), when the weft is very easy to fly (PL), the weft is very thin (NL), the rotational frequency of a weaving machine is a little fast (PS) and the textile width is a little narrow (NS).

R32: Decrease the basic pressure a little (NS), when the weft is very easy to fly (PL), the weft is very thin (NL), the rotational frequency of a weaving machine is a little fast (PS) and the textile width is standard (ZR).

R33: Decrease the basic pressure a little (NS), when the weft is very easy to fly (PL), the weft is very thin (NL), the rotational frequency of a weaving machine is a little fast (PS) and the textile width is a little wide (PS).

R34: Standardize the basic pressure (ZR), when the weft is very easy to fly (PL), the weft is very thin (NL), the rotational frequency of a weaving machine is a little fast (PS) and the textile width is wide (PM).

R35: Standardize the basic pressure (ZR), when the weft is very easy to fly (PL), the weft is very thin (NL), the rotational frequency of a weaving machine is a little fast (PS) and the textile width is very wide (PL).

R36: Decrease the basic pressure (NM), when the weft is very easy to fly (PL), the weft is very thin (NL), the rotational frequency of a weaving machine is fast (PM) and the textile width is very narrow (NL).

R37: Decrease the basic pressure a little (NS), when the weft is very easy to fly (PL), the weft is very thin (NL), the rotational frequency of a weaving machine is fast (PM) and the textile width is narrow (NM).

R38: Decrease the basic pressure a little (NS), when the weft is very easy to fly (PL), the weft is very thin (NL), the rotational frequency of a weaving machine is fast (PM) and the textile width is a little narrow (NS).

R39: Decrease the basic pressure a little (NS), when the weft is very easy to fly (PL), the weft is very thin (NL), the rotational frequency of a weaving machine is fast (PM) and the textile width is standard (ZR).

R40: Standardize the basic pressure (ZR), when the weft is very easy to fly (PL), the weft is very thin (NL), the rotational frequency of a weaving machine is fast (PM) and the textile width is a little wide (PS).

R41: Standarize the basic pressure (ZR), when the weft is very easy to fly (PL), the weft is very thin (NL), the rotational frequency of a weaving machine is fast (PM) and the textile width is wide (PM).

R42: Standardize the basic pressure (ZR), when the weft is very easy to fly (PL), the weft is very thin (NL), the rotational frequency of a weaving machine is fast (PM) and the textile width is very wide (PL).

R43: Decrease the basic pressure a little (NS), when the weft is very easy to fly (PL), the weft is very thin (NL), the rotational frequency of a weaving machine is very fast (PL) and the textile width is very narrow (NL).

R44: Standardize the basic pressure (ZR), when the weft is very easy to fly (PL), the weft is very thin (NL), the rotational frequency of a weaving machine is very fast (PL) and the textile width is narrow (NM).

R45: Standardize the basic pressure (ZR), when the weft is very easy to fly (PL), the weft is very thin (NL), the rotational frequency of a weaving machine is very fast (PL) and the textile width is a little narrow (NS).

R46: Standardize the basic pressure (ZR), when the weft is very easy to fly (PL), the weft is very thin (NL), the rotational frequency of a weaving machine is very fast (PL) and the textile width is standard (ZR).

R47: Increase the basic pressure a little (PS), when the weft is very easy to fly (PL), the weft is very thin (NL), the rotational frequency of a weaving machine is very fast (PL) and the textile width is a little wide (PS).

R48: Increase the basic pressure a little (PS), when the weft is very easy to fly (PL), the weft is very thin (NL), the rotational frequency of a weaving machine is very fast (PL) and the textile width is wide (PM).

R49: Increase the basic pressure a little (PS), when the weft is very easy to fly (PL), the weft is very thin (NL), the rotational frequency of a weaving machine is very fast (PL) and the textile width is very wide (PL).

r1: Increase the basic pressure a little (L), when the woven density is large (L).

r2: Do not change the basic pressure (M), when the woven density is medium (M).

r3: Do not change the basic pressure (M), when the woven density is small (S).

r4 Decrease the basic pressure a little (S), when the nozzle for easy flyability of weft is provided (L).

r5: Do not change the basic pressure (M), when the nozzle for normal flyability of weft is provided (M).

r6: Increase the basic pressure a little (L), when the nozzle for hard flyability of weft is provided (S).

r7: Decrease the basic pressure a little (S), when the reed for easy flyability of weft is provided (L).

r8: Do not change the basic pressure (M), when the reed for normal flyability of weft is provided (M).

r9: Increase the basic pressure a little (L), when the reed for hard flyability of weft is provided (S).

r10: Decrease the basic pressure a little (S), when the weft running time is large (L).

r11: Do not change the basic pressure (M), when the weft running time is normal (M).

r12: Increase the basic pressure a little (L), when the weft running time is small (S).

r13: Decrease the basic pressure a little (S), when the weft is easily cuttable (L).

r14: Do not change the basic pressure (M), when the easy cuttability of weft is medium (M).

r15: Do not change the basic pressure (M), when the weft is hard to be cut (S).

r16: Increase the basic pressure a little (L), when the weft unevenness in size is major (L).

r17: Do not change the basic pressure (M), when the weft unevenness in size is medium (M).

r18: Do not change the basic pressure (M), when the weft unevenness in size is minor (S).

r19: Increase the basic pressure a little (L), when the weft twist number is major (L).

r20: Do not change the basic pressure (M), when the weft twist number is medium (M).

r21: Decrease the basic pressure a little (S), when the weft twist number is minor (S).

At first, the fuzzy inference circuit 56 takes therein a predetermined weaving condition (i.e. the easy flyability of weft, the weft size, the rotational frequency of a weaving machine and the textile width) set in the setter of the input unit 60, the membership function of each weaving condition corresponding to the fuzzy labels as shown in FIG. 2(A) and stored in the memory unit 58, and the fuzzy control rules R1 through R49 stored in the memory unit 58 or the like (Step 101 in FIG. 3).

Then, the fuzzy inference circuit 56 calculates a basic pressure P0 of the fluid for weft inserting on the basis of each weaving condition, the membership functions for each weaving condition and for the basic pressure, and the fuzzy control rules R1 through R49 (Step 102 in FIG. 3).

In the fuzzy inference circuit 56, the basic pressure P0 at Step 102 can be obtained by:

A1) Calculating the degree of matching, namely, the degree of adaptations w1 through w49, of the weaving condition (i.e. the easy flyability of weft, the weft size, the rotational frequency of a weaving machine, and the textile width) for the antecedent parts in the fuzzy control rules R1 through R49 every each fuzzy control rule from R1 to R49 on the basis of each weaving condition and the membership function corresponding to each weaving condition;

A2) Calculating, then, adaptive functions u1 through u49 for indicating the degree of adaptations of the consequent parts in the fuzzy control rules R1 through R49 every each fuzzy control rule on the basis of the degree of adaptations w1 through w49 thus obtained and the membership function for the basic pressure;

A3) Calculating, then, a composite membership function, i.e., a fuzzy set S(u), from the adaptive functions u1 through u49 thus obtained; and A4) Calculating, then, a center-of-gravity value in the fuzzy set S(u) and defining the center-of-gravity value as a definite value resulting from the overall inference by the fuzzy control rules R1 through R49, that is, as the basic pressure P0.

Each degree of adaptation w1 through w49 and each adaptive function u1 through u49 can be obtained in such a way as indicated in FIGS. 4 through 9.

Figure 6:
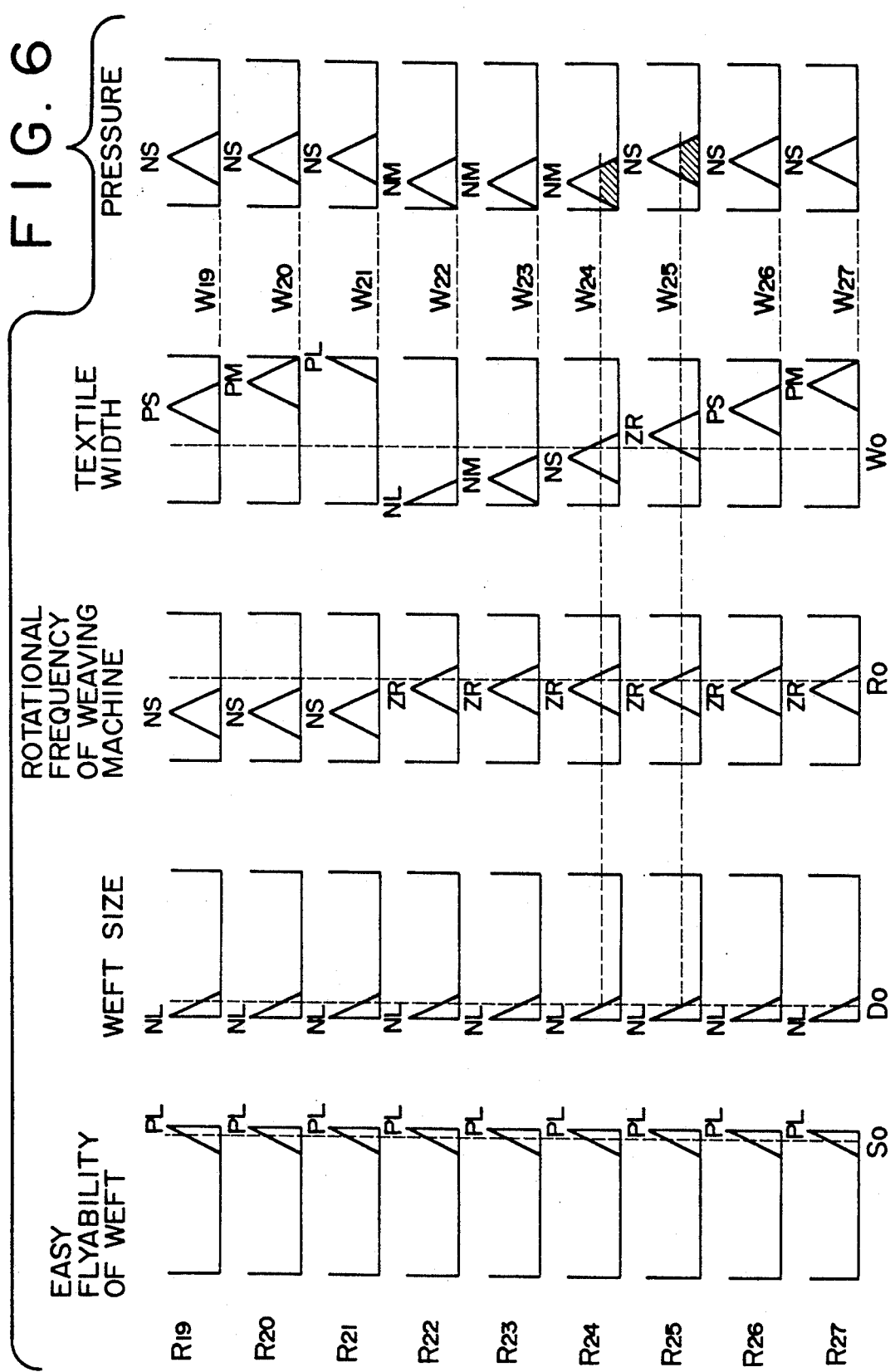
FIG. 6 is an explanatory view continuing to FIG. 5 and showing a fuzzy inference.
Figure 7:
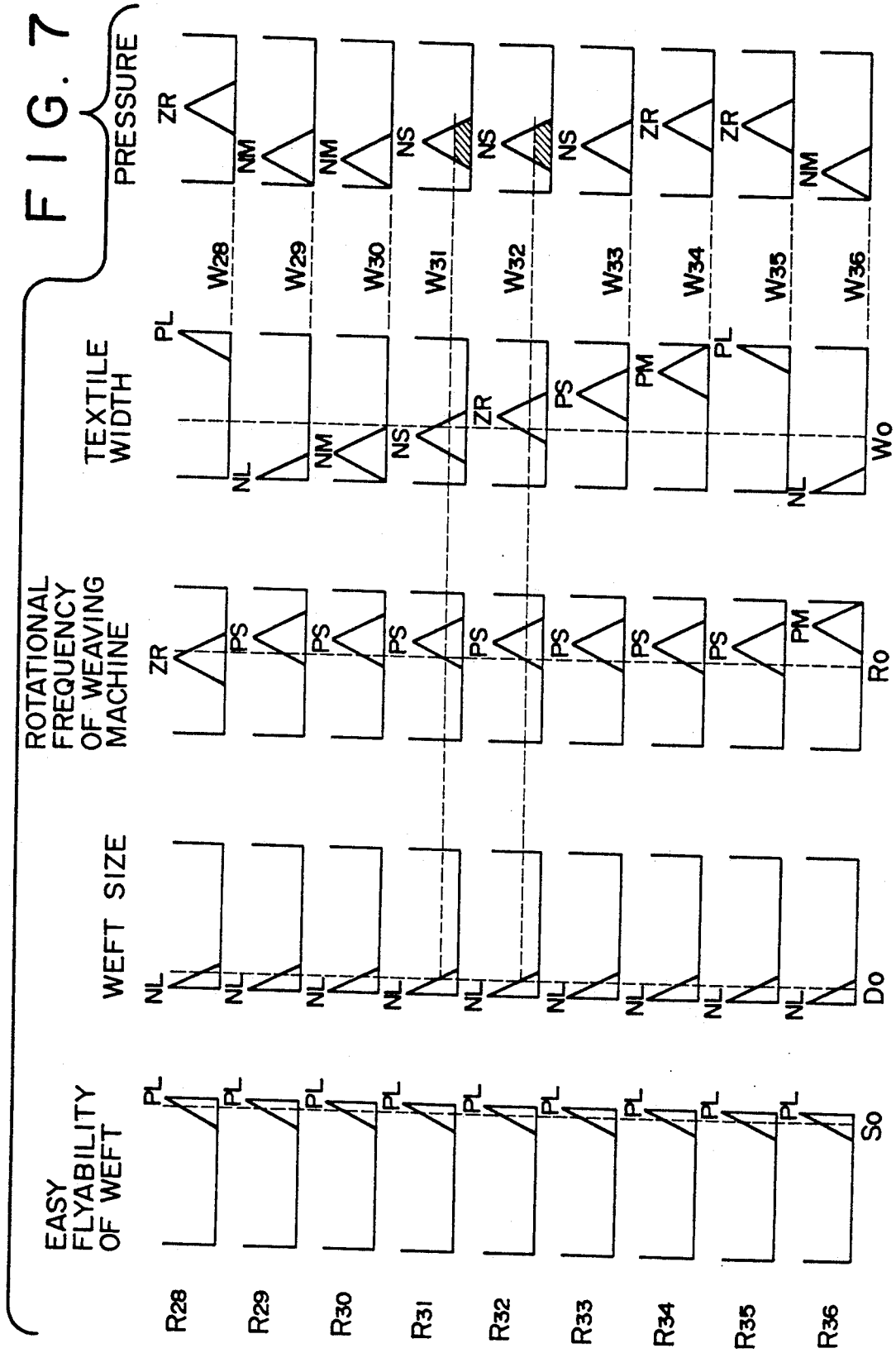
FIG. 7 is an explanatory view continuing to FIG. 6 and showing a fuzzy inference.
Figure 8:
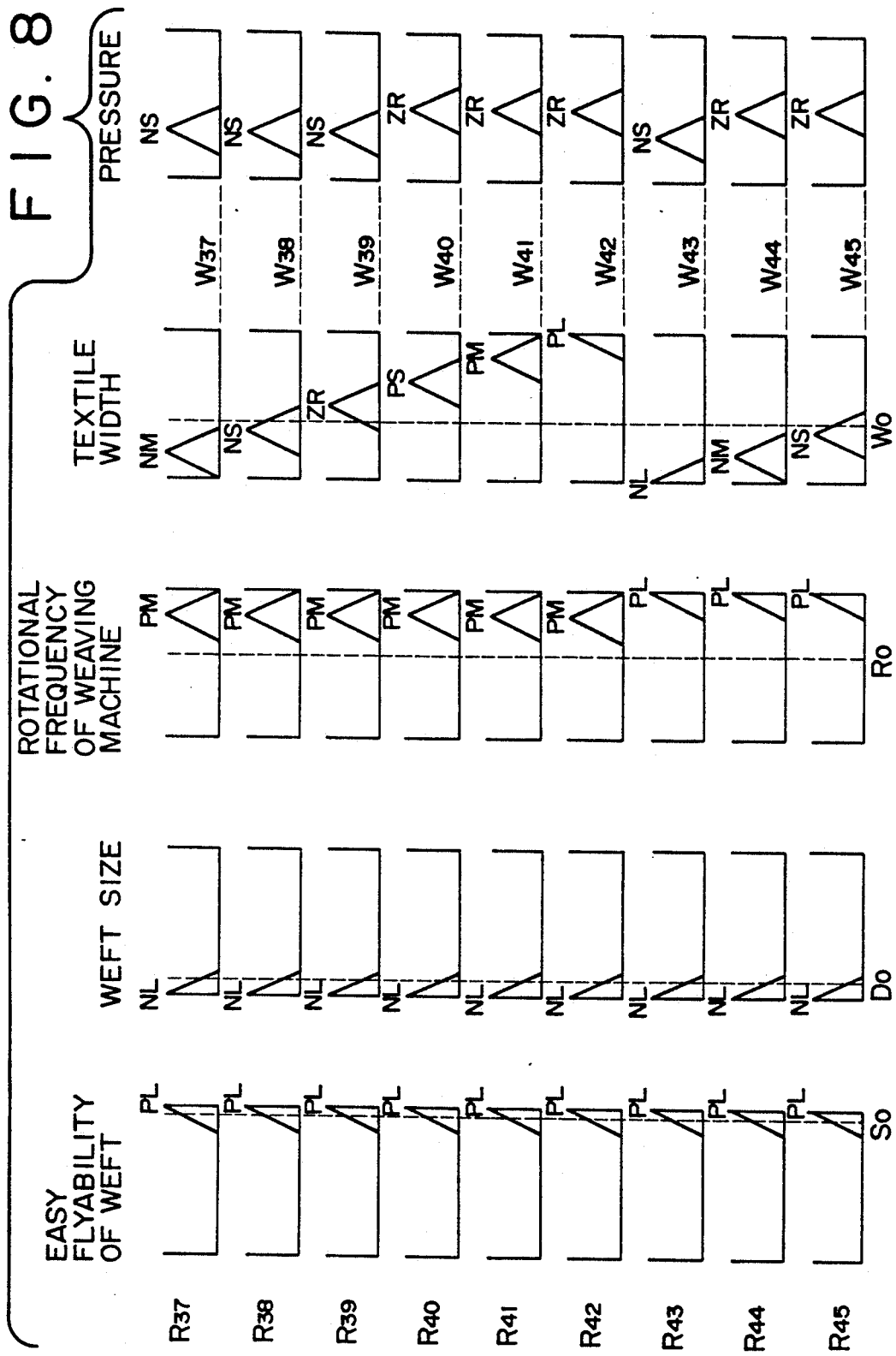
FIG. 8 is an explanatory view continuing to FIG. 7 and showing a fuzzy inference.

As indicated at R24 in FIG. 6, with reference to the fuzzy control rule R24, e.g., each degree of adaptation should be calculated for the value of each weaving condition (i.e. the easy flyability of a weft S0, the weft size D0, the rotational frequency R0 of a weaving machine, and the textile width W0) and for the membership functions PL, NL, ZR and NS which are set in the antecedent parts corresponding to each weaving condition. Then, a common portion in the degree of adaptations, i.e., the smallest degree of adaptation, is defined as the degree of adaptation w24 corresponding to the antecedent part in this fuzzy control rule R24.

Subsequently, a membership function NM for the basic pressure in the consequent part of the fuzzy control rule R24 should be cut off (headless) by the degree of adaptation w24 to obtain the minimum value (i.e., a common portion indicated by the shaded portion in FIG. 6) in the degree of adaptation w24 and the membership function NM. In the fuzzy control rule R24, the adaptive function u24 can be derived in this manner.

In a manner similar to the above description, the adaptive functions u1 through u23 and u25 through u49 for the fuzzy control rules R1 through R23, and R25 through R49 can be derived, respectively. Incidentally, when the degree of adaptation w is zero, then the corresponding adaptive function u become zero.

The center-of-gravity value in the fuzzy set S(u) is the value of the abscissa dividing an area of the composite membership function in half.

When the calculation of the basic pressure P0 is over, the fuzzy inference circuit 56 outputs the basic pressure P0 to the controller 62 (Step 103 in FIG. 3) and waits until the weft inserting frequency becomes equal to a predetermined frequency n (Step 104 in FIG. 3).

Accordingly, the pressure in the fluid provided from the pressure regulators 38 and 42 to the nozzles 32 and 34 is controlled by the pressure controller 62 so as to become the value provided from the fuzzy inference circuit 56 to the pressure controller 62.

When the weft inserting frequency becomes n, the fuzzy inference circuit 56 takes therein a predetermined weaving condition (e.g., the woven density B0, the nozzle performance N0, the reed performance O0, the weft properties or the like), set in the setter of the input unit 60, the weft running time T0 by the weft running time measurement circuit 70, the membership function corresponding to each weaving condition stored in the memory unit 58 and the fuzzy control rules r1 through r21 stored in the memory unit 58 (Step 105 in FIG. 3), and then calculates a corrected value ΔP of the basic pressure in a way similar to the way of calculating the basic pressure at Step 102 to adjust the basic pressure by use of the resultant corrected value ΔP (Step 106 in FIG. 3). The corrected value ΔP can be calculated in the manner shown in FIGS. 10 and 11.

In FIGS. 10 and 11, the woven density, the nozzle performance, the reed performance and the running time are adopted in the weaving condition.

Subsequently, the fuzzy inference circuit 56 outputs an addition result of the corrected value ΔP and the basic pressure P0 to the controller 62 (Step 107 in FIG. 3). By this process, the pressure of the fluid provided from the pressure regulators 38 and 42 to the nozzles 32 and 34 is controlled by the pressure controller 62 so as to become a new value provided from the fuzzy inference circuit 56 to the pressure controller 62.

The above step 104 can be omitted if necessary. In other words, the above described preferred embodiment is set so as to calculate the basic pressure P0 and thereafter the corrected value ΔP for a predetermined weft inserting frequency n (Step 104). However, this step 104 can be omitted and the basic pressure P0 may be calculated simultaneously with the corrected value ΔP. The pressure of weft inserting may need merely to be automatically controlled by a control method known per se, e.g., a control method for changing the pressure of weft inserting so as to provide the constant arrival timing.

Instead of calculating the basic pressure and the corrected value separately, only the basic pressure may be calculated by using one or more definite weaving conditions and one or more indefinite weaving conditions. Otherwise, the corrected value for the basic pressure preliminarily set in the input unit or in the pressure controller may be calculated by using one or more definite weaving conditions and one or more indefinite weaving conditions.

In the preferred embodiments as described above, the fuzzy control rules R1 through R49 and r1 through r29 are merely examples, and can be supplemented, modified and deleted if necessary.

What is claimed is:

1. An apparatus for controlling weft inserting in a jet loom, comprising:
    fuzzy inference circuit means for inferring a pressure value of fluid supplied to a weft inserting nozzle of the jet loom by a fuzzy inference on the basis of both a definite weaving condition and an indefinite weaving condition, said definite weaving condition being determined by at least one condition selected from the group consisting of manufacturer's textile specifications and manufacturer's weaving specifications, and said indefinite weaving condition being determined by human senses;
    means for inputting said definite weaving condition and said indefinite weaving condition to said fuzzy inference circuit means; and
    means for adjusting the pressure of said fluid on the basis of the inferred pressure value.

2. An apparatus for controlling weft inserting according to claim 1, wherein said definite weaving condition comprises at least one condition selected from the group consisting of weft type, weft size, woven density, fabric width, fabric texture, weft twist number, weft inserting nozzle type, reed type, the rotational frequency of the weaving machine, and the weft running time.

3. An apparatus for controlling weft inserting according to claim 1, wherein said indefinite weaving condition comprises at least one condition selected from the group consisting of indefinite weft characteristics, reed performance, and length of measuring unit performance.

4. An apparatus for controlling weft inserting in a jet loom, comprising:
    fuzzy inference circuit means for inferring a pressure value of fluid supplied to the jet loom weft inserting nozzle by a fuzzy inference on the basis of both at least one definite weaving condition and at least one indefinite weaving condition, said at least one definite weaving condition being selected from the group of textile related set-up conditions consisting of weft type, weft size, woven density, fabric width, fabric texture, and weft twist number, and at least one weaving machine related set-up condition selected from the group consisting of weft inwerting nozzle type, reed type, rotational frequency of the weaving machine, and weft running time, and said at least one indefinite weaving condition being determined by human sensing and being selected from the group of weaving conditions consisting of indefinite weft characteristics, reed performance, nozzle performance and length measuring unit performance;
    means for inputting said at least one definite weaving condition to said fuzzy inference circuit means;
    means for inputting said at least one definite weaving condition to said fuzzy inference circuit means; and
    pressure controller means for adjusting the pressure of said fluid on the basis of the inferred pressure value.

* * * * *